(12) United States Patent
Lippert et al.

(10) Patent No.: US 7,938,437 B2
(45) Date of Patent: May 10, 2011

(54) METHOD FOR PRODUCING A WEAKENED ZONE, IN PARTICULAR A PREDETERMINED BREAKING POINT FOR AN AIRBAG EXIT OPENING, COMPONENT AND APPARATUS

(75) Inventors: Martin Lippert, Meerbusch (DE); Dieter Renner, Kempen (DE); Hartmut Harnisch, Grefrath (DE)

(73) Assignee: Johnson Controls Technology Company, Holland, MI (US)

( * ) Notice: Subject to any disclaimer, the term of this patent is extended or adjusted under 35 U.S.C. 154(b) by 165 days.

(21) Appl. No.: 12/094,246

(22) PCT Filed: Oct. 20, 2006

(86) PCT No.: PCT/EP2006/010126
§ 371 (c)(1),
(2), (4) Date: Jun. 2, 2009

(87) PCT Pub. No.: WO2007/057084
PCT Pub. Date: May 24, 2007

(65) Prior Publication Data
US 2009/0302579 A1    Dec. 10, 2009

(30) Foreign Application Priority Data
Nov. 18, 2005  (DE) .......................... 10 2005 055 553

(51) Int. Cl.
*B60R 21/205* (2006.01)
*B23K 26/38* (2006.01)

(52) U.S. Cl. ...................... 280/728.3; 280/732; 264/154; 219/121.67; 219/121.71; 219/121.85; 83/862

(58) Field of Classification Search .............. 83/862, 83/875; 219/121.6, 121.67, 121.71, 121.72, 219/121.85; 264/154, 155, 156, 482; 280/728.1, 728.3, 732
See application file for complete search history.

(56) References Cited

U.S. PATENT DOCUMENTS

| 4,124,965 | A | * | 11/1978 | Stahl ............................... 53/412 |
| 5,375,875 | A | * | 12/1994 | DiSalvo et al. ............ 280/728.3 |
| 5,883,356 | A | * | 3/1999 | Bauer et al. .............. 219/121.62 |

(Continued)

FOREIGN PATENT DOCUMENTS

DE    37 21 610 A1    1/1989

(Continued)

OTHER PUBLICATIONS

International Search Report, PCT/EP06/010126, dated Jan. 31, 2007, 6 pages.

*Primary Examiner* — Eric Culbreth
*Assistant Examiner* — Joseph Rocca
(74) *Attorney, Agent, or Firm* — Fletcher Yoder P.C.

(57) ABSTRACT

In a method for producing a weakened zone, in particular a predetermined breaking point for an airbag exit opening, in a carrier part equipped on the visible side with a decorative material, in particular a leather decoration, the carrier part is provided with a weakened section using first process, and weakening of the decorative material is performed through the weakened section of the carrier part using a second process. The weakening of the carrier part and the weakening of the decorative material taking place temporally close to one another, in particular at the same time. Furthermore, the invention relates to a component and an apparatus for carrying out the method.

21 Claims, 4 Drawing Sheets

U.S. PATENT DOCUMENTS

| | | | |
|---|---|---|---|
| 6,070,901 A * | 6/2000 | Hazell et al. | 280/728.3 |
| 6,294,124 B1 * | 9/2001 | Bauer et al. | 264/400 |
| 6,737,607 B2 * | 5/2004 | Nicholas et al. | 219/121.7 |
| 6,808,197 B2 * | 10/2004 | Bauer et al. | 280/728.3 |
| 7,297,897 B2 * | 11/2007 | Nicholas et al. | 219/121.7 |
| 7,431,328 B2 * | 10/2008 | Wittenbecher et al. | 280/728.3 |
| 7,770,916 B2 * | 8/2010 | Okumura et al. | 280/728.3 |

FOREIGN PATENT DOCUMENTS

| | | |
|---|---|---|
| DE | 41 13 633 A1 | 10/1992 |
| DE | 199 45 022 A1 | 6/2000 |
| DE | 199 44 371 A1 | 3/2001 |
| DE | 101 22 312 A1 | 11/2002 |
| DE | 101 28 746 A1 | 1/2003 |
| DE | 102 29 962 A1 | 1/2004 |
| DE | 103 52 524 A1 | 6/2005 |
| EP | 0 593 783 A1 | 10/1993 |
| EP | 0 711 627 A2 | 5/1996 |
| EP | 0 991 551 B1 | 10/2001 |
| EP | 1 219 405 A1 | 7/2002 |
| JP | 61164738 A | 7/1986 |
| JP | 02198193 A | 8/1990 |
| JP | 04289038 A | 10/1992 |

* cited by examiner

METHOD FOR PRODUCING A WEAKENED ZONE, IN PARTICULAR A PREDETERMINED BREAKING POINT FOR AN AIRBAG EXIT OPENING, COMPONENT AND APPARATUS

The invention relates to a method for producing a weakened zone, in particular a predetermined breaking point for an airbag exit opening, in a carrier part which is equipped on the visible side with a decorative material, in particular a leather decoration, as well as a component accordingly machined and an apparatus for carrying out the method.

PRIOR ART

A generic method and component are known from the publication DE 102 60 988 A1. The component, for example a dashboard for a motor vehicle, consists of a planar carrier part which is covered on the visible side with a textile decorative material. In order to allow an airbag arranged in the dashboard to be deployed when activated as a result of an accident, and to penetrate the vehicle passenger compartment, the dashboard is equipped with an airbag exit cover which is not visible from the vehicle interior, which is formed by, for example, a U-shaped peripheral weakened line and a hinge region in the carrier part and the decorative material. The deployed airbag tears the airbag exit cover along the weakened line, said airbag exit cover pivoting about the hinge region, for example upwards in the direction of the windshield. During the manufacture of the dashboard, a weakened section in the form of a linear arrangement of blind holes is introduced into the textile decorative material, initially by means of a laser, which is subsequently arranged on the carrier part by introducing a foam intermediate layer. A second weakened section is then made which coincides with the weakened section of the decorative material on the carrier part.

In the publication DE 199 44 371 A1 a method is disclosed for producing an invisible predetermined breaking point in a leather decoration by machining the rear face with a milling tool. Even with this method the weakening of the carrier part has to take place after applying the decorative material.

In both cases, therefore, two operating steps are required which are spatially and temporally set apart from one another, in order to provide the relevant component with a weakened zone.

In the publication EP 0 991 551 B1, moreover, a method for producing a weakened line in a composite structure made up of a carrier part and a decorative material is disclosed, in which a high-powered pulsed laser strikes the rear face of the carrier part and removes material in the manner of a blind hole in the decorative material. This method is efficient but does not lead to functionally and/or visually satisfactory results with all decorative materials, in particular with textile or leather decorations.

OBJECT

The object of the invention is to provide an economic method and a suitable apparatus for introducing weakened lines in a composite structure made up of a carrier part and a thermally sensitive decorative material.

SOLUTION

The object is achieved in a generic method by the carrier part being provided with a weakened section using first means and weakening of the decorative material being performed through the weakened section of the carrier part using further means, the weakening of the carrier part and the weakening of the decorative material taking place temporally close to one another, preferably at the same time, i.e. within one machining cycle.

As a result, it is possible for the machining of the carrier part and the decorative material to use different methods which are respectively optimized with regard to the different materials of the carrier part and the decorative material, and which are carried out at the same place and without delay.

The weakening in the carrier part is preferably configured as at least one opening through the carrier part and takes place as a result of machining by cutting or removing material, in particular by means of a milling tool or a laser. This procedure allows a rapid machining of the generally relatively thick-walled carrier part, by relatively simple means. It is also naturally conceivable to allow a wall to remain at the weakened section of the carrier part, which is easily penetrated in the subsequent machining of the decorative material.

The weakening of the decorative material is, however, preferably configured as at least one recess entering the decorative material but not penetrating right through said decorative material, for example as a linear arrangement of blind holes. This does not exclude the fact that recesses with microperforations are provided at specific intervals which are used as a guide for the operation of a machining laser. The recesses are advantageously produced by machining the decorative material on the rear face with a carbon dioxide laser or erbium YAK laser. As the laser is not used for machining the carrier part, it may be designed to be sufficiently low-powered that the investment costs are considerably reduced and the risk of burning through the blind hole as far as the visible side of the decorative material is minimized.

The laser may, therefore, be guided through the tool for the machining of the carrier part by cutting or removing material, in particular the milling tool or the aforementioned other laser, as far as the decorative material. Alternatively, it is conceivable to guide the laser past the tool for the machining of the carrier part by cutting or removing material, in particular the milling tool or the other laser, as far as the decorative material.

The component to be machined according to the invention may comprise a foam layer arranged between the carrier part and the decorative material, which connects said carrier part and decorative material to one another and enhances the haptics of the component. In this case it is advantageous to guide the opening through the carrier part until into the foam layer, whilst the remaining thickness of the foam layer as well as the decorative material is weakened by means of lasers.

An apparatus for carrying out the method disclosed above preferably has a drive device for operating a cutting tool, a laser source and a device for guiding the laser into the working region of the cutting tool. The cutting tool may in this case, for example, be guided by an industrial robot along the desired weakened zone, whilst the laser beam guided by means of a flexible fiber-optic conductor performs the weakening of the decorative material, approximately simultaneously with the machining of the carrier part.

The cutting tool may be configured as an end milling cutter provided with a longitudinal bore, through which the laser may be guided onto the rear face of the decorative material. Moreover, a side milling cutter provided with secant-like bores could be used, through which the laser may be guided. Alternatively it is proposed to guide the laser past the cutting tool onto the rear face of the decorative material.

Moreover, it is conceivable that the apparatus for carrying out the method according to the invention has a first and a second laser source, the first, preferably less powerful, laser being guided into the working region of the second, preferably more powerful, laser.

FIGURES

The figures schematically represent by way of example various embodiments of the invention.

Figure 1:
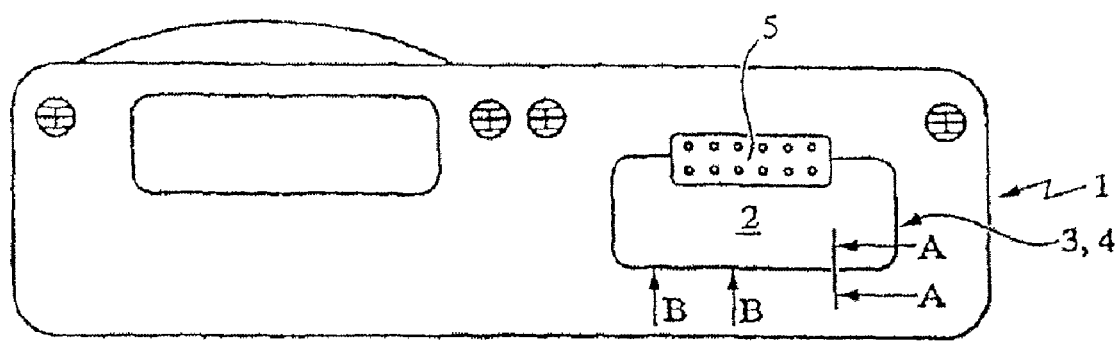
FIG. 1 shows a plan view of a dashboard for a motor vehicle machined according to the invention.

The dashboard 1 illustrated in FIG. 1 is equipped on the passenger side with an airbag exit cover 2, which is defined by a weakened zone 3 in the form of a peripheral U-shaped predetermined breaking point 4 and a hinge region 5. The predetermined breaking point 4 and the hinge region 5 are not visible from the vehicle interior, so that the airbag exit cover as a whole (apart from an SRS identification) is not visible, as such, before the deployment of the airbag.

Figure 2:
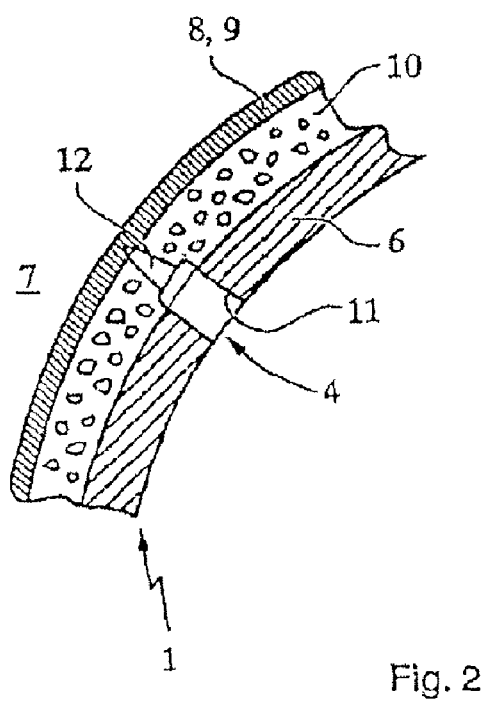
FIG. 2 shows a section A-A through the dashboard transversely to the predetermined breaking point.

As is visible from the section according to FIG. 2, the dashboard 1 consists of a relatively thick-walled carrier part 6 made of injection-molded or pressed plastics, which is covered in the direction of the vehicle interior 7 with a decorative material 8 in the form of a leather decoration 9. Between the leather decoration 9 and the carrier part 6 is located a foam layer 10 made of polyurethane foam, which connects the leather decoration 9 and the carrier part 6 to one another.

The predetermined weakened point 4 consists of a first weakened section in the form of openings 11 in the carrier part 6 and a second weakened section which consists of recesses 12 in the manner of blind holes in the leather decoration 9. The openings 11 extend into the foam layer 10. The visible surface of the leather decoration 9, however, is not penetrated by the recesses 12 so that the predetermined breaking point 4 is invisible from the vehicle interior 7.

Figure 3:
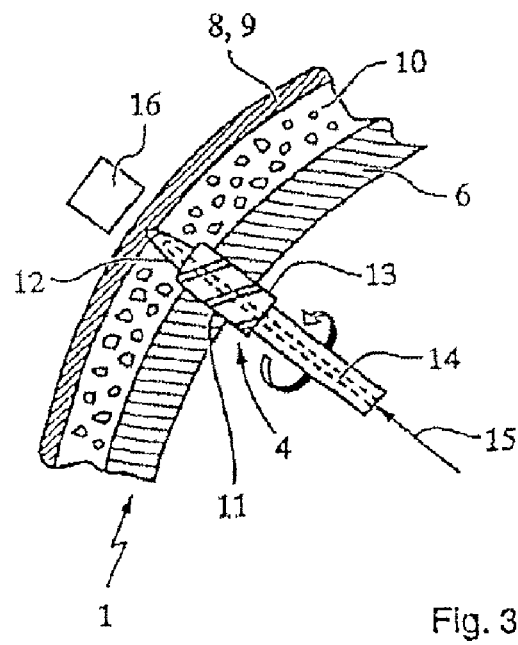
FIG. 3 shows the production of the predetermined breaking point in the section A-A by using a first apparatus according to the invention.

For producing the predetermined breaking point 4, as shown in FIG. 3, a rotating end milling cutter 13 is guided along the weakened zone 3 through the carrier part 6 and part of the foam layer 10 and removes material there in a cutting operation in order to introduce the linear opening 11. The end milling cutter 13 is provided along its longitudinal axis with a bore 14 through which during the milling process a pulsed laser (laser beam 15) is guided toward the remaining foam layer 10 and the leather decoration 9. With every pulse, the laser vaporizes material from the foam layer 10 and leather decoration 9 and also dust which is possibly present from the machining of the carrier part 6. At the same time, a sensor 16 measures the increasing intensity of the laser beam 15 shining through the remaining cross section of the leather decoration 9, and switches off the laser, before the recess 12 penetrates to the visible side or color alterations become visible as a result of the (comparatively low) thermal stress of the leather decoration 9.

Figure 4:
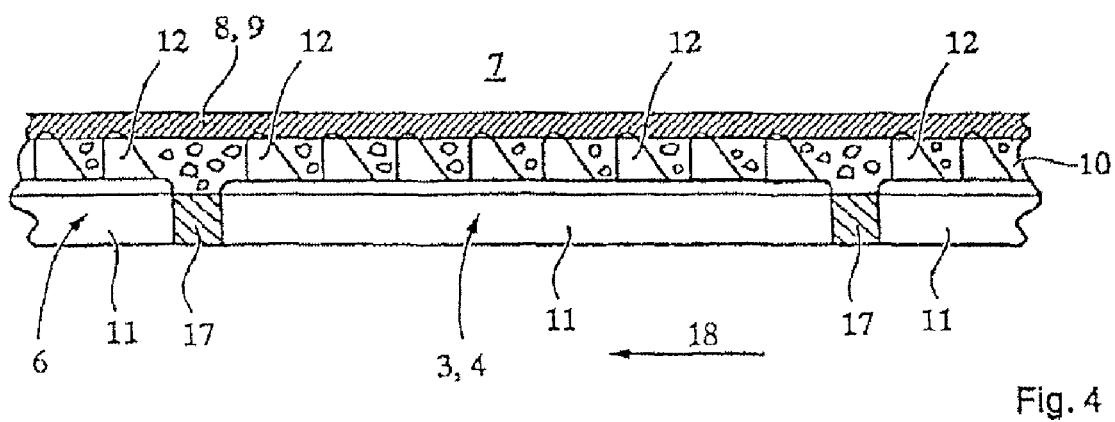
FIG. 4 shows a section B-B along the predetermined breaking point according to FIGS. 3 and 4.

As the connection of the airbag exit cover 2 to the remaining dashboard 1 requires a certain strength, the milled openings 11 are interrupted by webs 17, by means of which the carrier part 6 directly connects the airbag exit cover 2 to the dashboard 1 (FIG. 4). With the continuous advance of the end milling cutter 13 along the predetermined breaking point 4, at a feed rate of approximately 50 to 100 mm/min, said end milling cutter is lifted at specific intervals away from the dashboard 1 and subsequently penetrates again into the carrier part 6. The region of the carrier part 6 which has been unmachined in the meantime, subsequently forms the webs 17.

By the advance of the end milling cutter 13 (arrow 18) the pulsing laser beam 15 during the production of the recesses 12 also strikes the leather decoration 9, offset along the predetermined breaking point 4. The recesses 12 therefore do not have, as in the section along the predetermined breaking point 4 which is visible according to FIG. 4, a rotationally symmetrical contour but are configured in the manner of saw teeth. The use of the end milling cutter 13 is recommended, in particular, for the production of curved peripheral weakened zones 3, for example in the corner region of the airbag exit cover 2.

Figure 5:
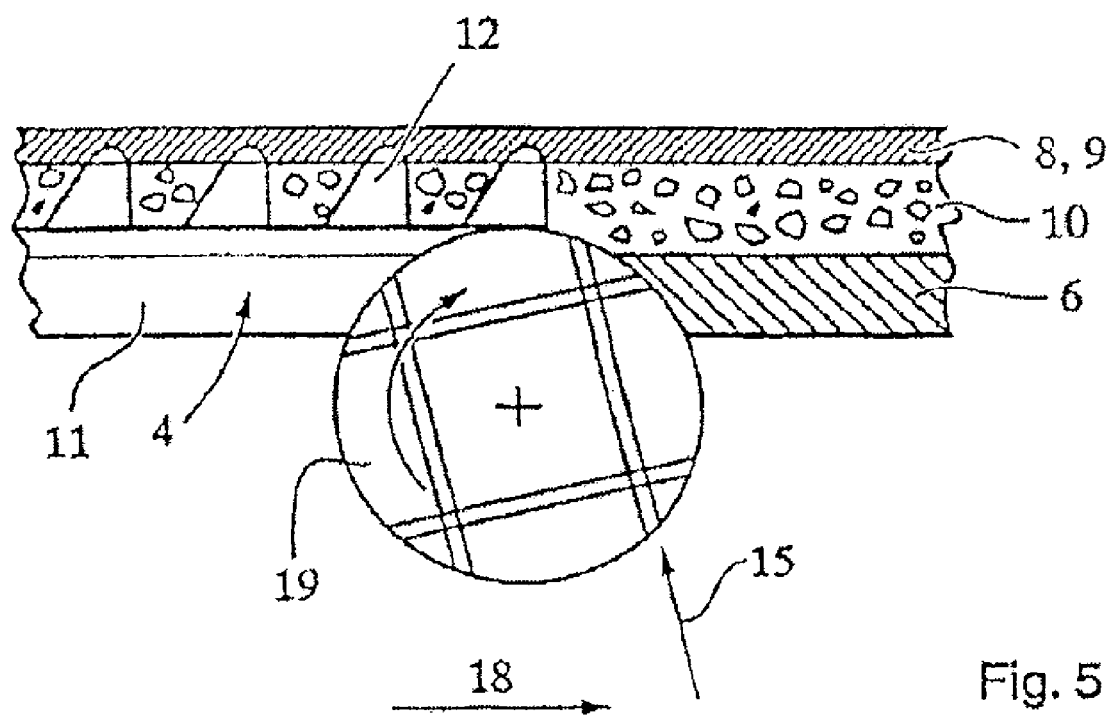
FIG. 5 shows a section B-B by producing the predetermined breaking point with a different apparatus.

As shown in FIG. 5, the machining may also take place by means of a side milling cutter 19, in which secant-like bores 14 are inserted. In the predetermined rotary positions of the side milling cutter 19, the laser beam 15 may be guided through the bores 14 as far as the leather decoration 9 in a manner which is synchronized with the side milling cutter. By using the side milling cutter 19, predetermined breaking points 4 are preferably produced which extend in a straight line.

Figure 6:
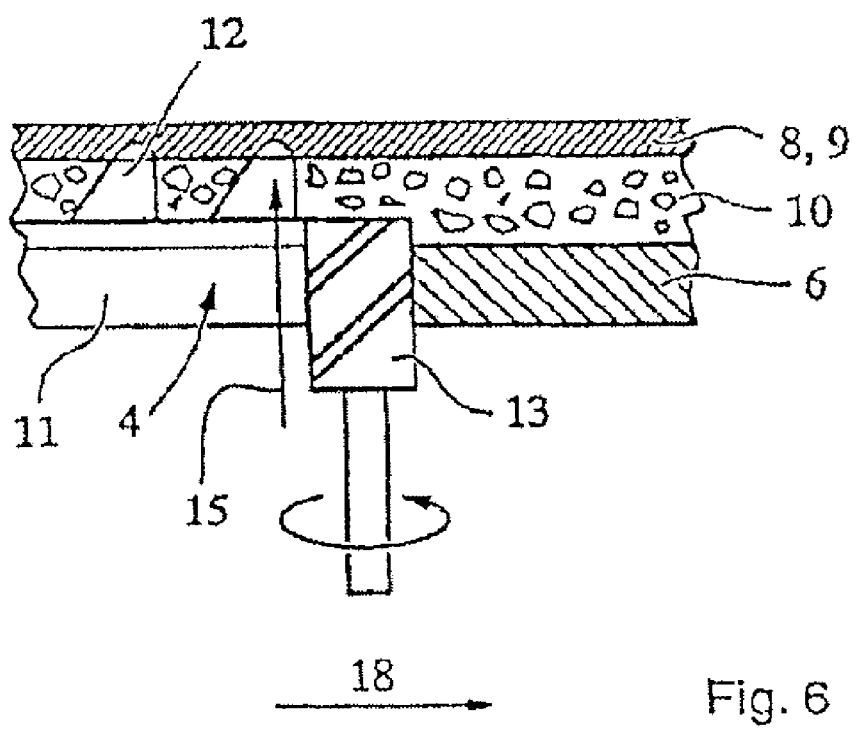
FIG. 6 shows a further apparatus for producing the predetermined breaking point in the section B-B.

In FIG. 6 an apparatus is shown during the machining of the dashboard 1, in which the laser beam 15 is guided past the rotating end milling cutter 13 and through the already milled opening 11 in the direction of the leather decoration 9, the end milling cutter 13 and the laser beam 15 in the embodiment being moved forward at the same distance in the direction of the arrow 18. In principle, it is naturally also conceivable to position the laser beam 15 fixedly during the production of each recess 12 and then to allow the end milling cutter 13 which has already been moved away to be retarded.

Figure 7:
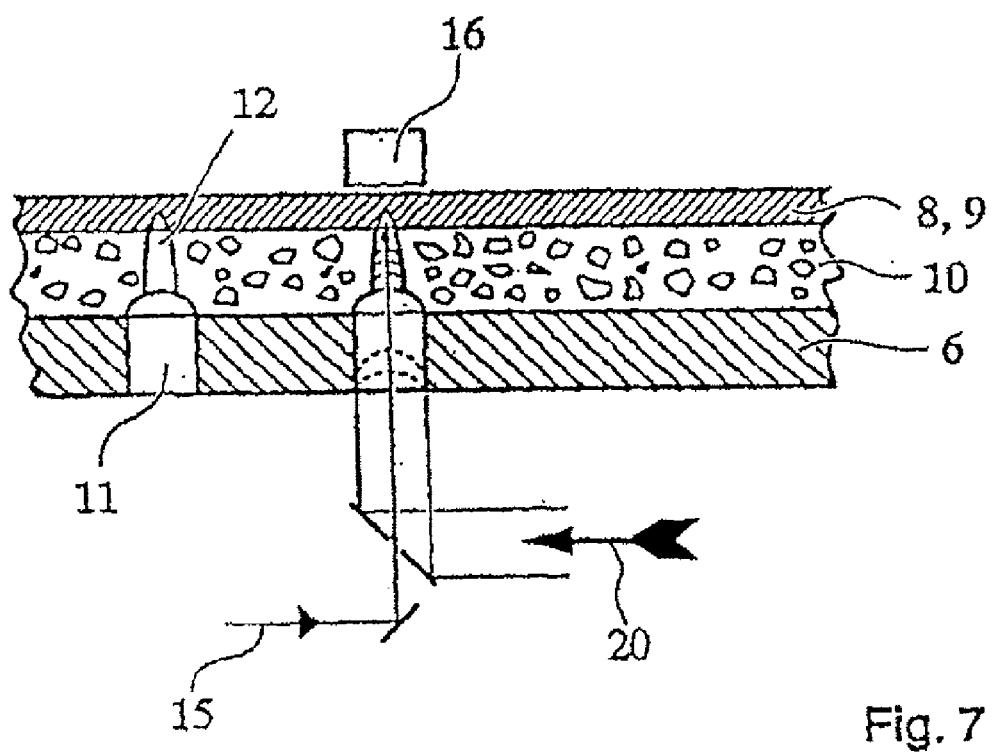
FIG. 7 shows a further apparatus according to the invention for carrying out the method according to the invention.

As is visible from FIG. 7, the machining of the carrier part 6 may also take place by means of a powerful laser (laser beam 20). In the embodiment, both laser beams 15, 20 strike the carrier part 6 at a common working point and remove the material for producing the bore-like openings 12. After a machining period which has been previously established by experimentation, the opening 11 is produced so that the powerful laser beam 20 is switched off and the machining of the leather decoration 9 only takes place through the opening 11 by the less powerful laser beam 15. It is naturally possible only to switch on the low-powered laser beam 15 when the opening 11 has already been produced by the more powerful laser beam 20. It is also conceivable to operate the laser beams 15, 20 adjacent to one another, the powerful laser beam 20 machining the carrier part 6, whilst the less powerful laser beam 15 removes material from the leather decoration 9 through the opening 11 which has been made shortly before.

The invention claimed is:

1. A method for producing a predetermined breaking point for an airbag exit opening in a carrier part which is equipped on a visible side with a decorative material comprising:
   providing the carrier part with a weakened section using a first process; and
   weakening the decorative material through the weakened section of the carrier part using a second process;

wherein providing the weakened section of the carrier part and weakening the decorative material take place at substantially the same time as one another.

2. The method as claimed in claim 1, characterized in that providing the weakened section of the carrier part comprises providing at least one opening through the carrier part.

3. The method as claimed in claim 2, characterized in that providing the weakened section comprises guiding the opening through the carrier part until the opening extends into a foam layer located between the carrier part and the decorative material.

4. The method as claimed in claim 1, characterized in that weakening the carrier part comprises machining the carrier.

5. The method as claimed in claim 4, wherein machining the carrier part comprises at least one of removing material from or cutting the carrier part using at least one of a milling tool and a laser.

6. The method as claimed in claim 5, wherein machining the carrier part further comprises at least one of removing material from or cutting the carrier at least as far as the decorative material.

7. The method as claimed in claim 1, characterized in that weakening the decorative material comprises:
providing at least one recess at least extending into the decorative material.

8. The method as claimed in claim 7, further characterized in that providing the at least one recess at least extending into the decorative material comprise providing a linear arrangement of blind holes.

9. The method as claimed in claim 7, wherein providing at least one recess at least extending into the decorative material comprises providing at least one recess that does not penetrate completely through the decorative material.

10. The method as claimed in claim 1, characterized in that weakening the decorative material comprises machining the decorative material with a laser.

11. The method as claimed in claim 10, characterized in that machining the decorative material with a laser comprises guiding the laser through a tool that is used for machining the carrier part.

12. The method as claimed in claim 10, characterized in that machining the decorative material with a laser comprises guiding the laser past a tool that is used for machining the carrier part.

13. The method as claimed in claim 10, wherein the laser is a carbon dioxide ($CO_2$) laser or an erbium YAK laser.

14. The method as claimed in claim 1, wherein providing the weakened section of the carrier part and weakening the decorative material take place at the same time.

15. A component for a motor vehicle, comprising a carrier part that is equipped on a visible side of the component with a decorative material, the component having a predetermined breaking point for an airbag exit opening, characterized in that the carrier part is provided with a weakened section using a first process and a weakened section of the decorative material is provided through the weakened section of the carrier part using a second process.

16. The method as claimed in claim 15, wherein the decorative material is leather.

17. The method as claimed in claim 15, wherein the component for a motor vehicle is an inner cladding part.

18. An apparatus for producing a predetermined breaking point for an airbag exit opening in a carrier part having a decorative material provided on a visible side of the carrier part comprising:
a drive device for operating a cutting tool, that is usable to provide the carrier part with a weakened section;
a laser source usable to provide the decorative material with a weakened section; and
a device for guiding the laser source into the working region of the cutting tool and through the weakened section of the carrier part.

19. The apparatus as claimed in claim 18, characterized in that the cutting tool is configured as an end milling cutter provided with a longitudinal bore, through which at least a portion of the laser source may be guided.

20. The apparatus as claimed in claim 18, characterized in that the cutting tool is configured as a side milling cutter provided with at least one secant-like bores, through which the laser source may be guided.

21. The apparatus as claimed in claim 18, characterized in that the laser source may be guided past the cutting tool.

* * * * *